Sept. 23, 1952   C. D. P. SMALLPEICE   2,611,326
TROLLEY
Filed July 20, 1950
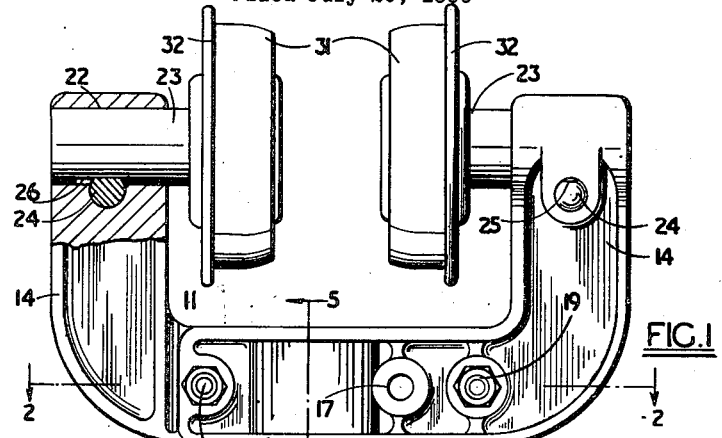
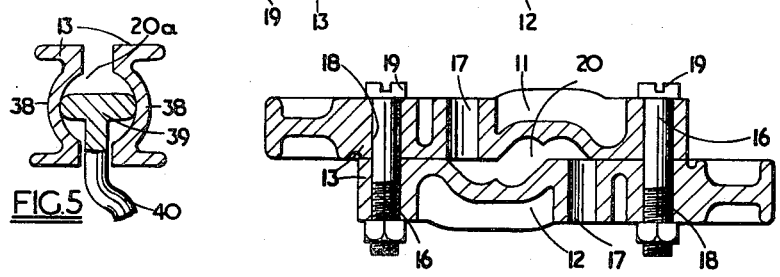
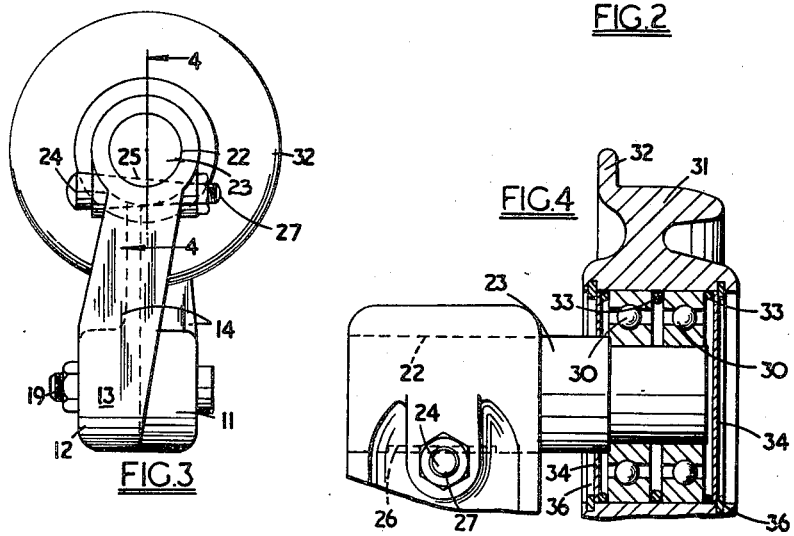
Inventor
*C. D. P. SMALLPEICE*
By
Mawhinney & Mawhinney
Attorneys Patented Sept. 23, 1952

2,611,326

UNITED STATES PATENT OFFICE 2,611,326

TROLLEY

Cosby D. P. Smallpeice, Swanwick Shore, near Southampton, England

Application July 20, 1950, Serial No. 174,903
In Great Britain September 12, 1949

3 Claims. (Cl. 105—154)

This invention relates to a rail trolley, and particularly to one which is to hang from an elevated rail.

The main object of the invention is to provide an inexpensive rail trolley of robust construction which can be adjusted in a simple manner for different rail sizes.

According to the invention, the trolley includes a U-shaped bracket formed of similar complementary halves having overlapping portions (forming the bridging portion of the U-shaped bracket) secured together by bolts or the like which can be selectively passed through a plurality of holes to allow adjustment of the limbs of the bracket towards or away from one another, and each limb rotatably supports a rail-engaging roller adjacent its inner face.

In the accompanying drawings:

Figure 1 is a part-sectional elevation of a rail trolley according to the invention;

Figure 2 is a section on the line 2—2 of Figure 1;

Figure 3 is an elevation from the right of Figure 1;

Figure 4 is a section on the line 4—4 of Figure 3 to a larger scale; and

Figure 5 is a section, taken on the line 5—5 of Figure 1, but showing a modification In the construction shown by Figures 1 to 4, each of said halves 11, 12 is shaped rather like an L, so that when the long portions 13 of each L are placed in overlapping relation the shorter portion 14 of each L will form one of the limbs of the U-shaped bracket. The long portion of each L has at its free end a bolt hole 16, and two longitudinally spaced bolt holes 17, 18 towards where the shorter portion branches from the long portion. The bolt hole 16 at the end of the long portion is always used for a bolt 19, and this bolt can be selectively placed through either of the two bolt holes 17, 18 in the other long portion to give two alternative widths of U-bracket.

Conveniently each long portion of the L is bowed outwardly between the end bolt hole 16 and the next bolt hole 17 to form a gap 20 with the corresponding bowed part of the other long portion when the two are secured together in either adjusted position, the gap serving, for example, to receive a depending support for a hoist or other apparatus to be carried by the trolley.

The extremities of the limbs of the U-bracket have aligned eyes 22 in them in which are slidably mounted spindles 23. These can be locked in axially-adjusted positions by means of bolts or the like passed through the limbs to have an interference engagement with the spindles. In the example shown use is made of pins 24, 24 each with an inclined flat 25 on it coacting with a transverse flat 26 on the spindle, the smaller end of the pin being screw-threaded to receive a nut 27. The flat 26 on each spindle is formed as a recess over a certain length, so that engagement with the pin 24 will limit the extent of the possible axial adjustment of the spindle when the nut on the pin is released.

The spindles extend inwardly of the limbs of the bracket, and each carries a pair of axially-spaced ball bearings 30 supporting a roller 31 having a radially-extending flange 32 at its end remote from the other roller. Each roller may have a machined bore to receive the outer race rings of the ball bearings, suitable spaces 33 being provided between the ball bearings and also between the latter and closure plates 34 at the ends, the closure plates being retained in position by means of circular clips 36 fitted in grooves near the ends of the bore of the roller.

Such a trolley can be inexpensively manufactured to be of robust construction. The main adjustment is effected by adjusting the limbs of the U-shaped bracket towards and away from one another, and fine adjustment can be obtained by axial movement of the spindles for the rollers.

The modification of Figure 5 differs from the construction of Figures 1 to 4 in that the parts of the long portions 13, which coact with one another to form the gap 20, are concave towards one another, as shown at 38, instead of being parallel sided, as in the case of Figures 1 to 4, thus providing a part-spherical gap 20a pivotally to receive the head 39 of a hook 40 to which a load can be attached.

What I claim as my invention and desire to secure by Letters Patent of the United States is:

1. A rail trolley including a U-shaped bracket formed of similar complementary halves having overlapping portions forming the bridging portion of said bracket and defining between them a gap for the reception of a support for a load, and securing bolts which can be selectively passed through registering pairs of a plurality of holes in said overlapping portions to hold them relatively immovably with the limbs of said bracket spaced at alternative distances but without closing said gap, each said limb axially-slidably supporting in a bore thereof a spindle on which is journalled a rail-engaging roller, said spindles being co-axial and said rollers being adjacent the inner faces of said limbs, and means reacting between said limbs and spindles for locating the latter in an axially slid position so as to provide a fine adjustment of the distance between said rollers.

2. A rail trolley including U-shaped bracket formed of similar complementary halves having overlapping portions forming the bridging portion of said bracket and defining between them a gap for the reception of a support for a load, and securing bolts which can be selectively passed through registering pairs of a plurality of holes in said overlapping portions to hold them relatively immovably with the limbs of said bracket spaced at alternative distances but without closing said gap, each said limb axially-slidably supporting in a bore thereof a spindle on which is journalled a rail-engaging roller, said spindles being co-axial and said rollers being adjacent the inner faces of said limbs, said spindles formed with flats interiorly of the bores of said limbs, said limbs having transverse holes communicating with said bores and axially adjustable wedge members in said holes for coaction with said flats for holding said spindles in an axially adjusted position whereby to provide a fine adjustment of the distance between said rollers.

3. A rail trolley, according to claim 2, in which the wedge members have their smaller ends screw-threaded and extending outwardly of said limbs and have nuts on them for tightening purposes.

COSBY D. P. SMALLPEICE.

REFERENCES CITED

The following references are of record in the file of this patent:

UNITED STATES PATENTS

| Number | Name | Date |
|---|---|---|
| 960,728 | Steedman | June 7, 1910 |
| 1,151,226 | Steedman | Aug. 24, 1915 |
| 1,551,308 | Howard | Aug. 25, 1925 |
| 1,810,578 | Schirmer | June 19, 1931 |
| 1,944,713 | Koons | Jan. 23, 1934 |
| 2,003,162 | Ulmer | May 28, 1935 |